Patented July 7, 1942

2,288,825

UNITED STATES PATENT OFFICE 2,288,825

PROCESS FOR MAKING MODIFIED EVAPORATED MILK

John P. Meyenberg, Salinas, Calif.

No Drawing. Application April 5, 1940,
Serial No. 328,053

3 Claims. (Cl. 99—54)

This invention relates to improvements in a product and the process of making a type of evaporated milk, and relates more particularly to a process for making a modified evaporated milk having improved digestibility and reduced curd characteristics. It is to be distinguished from the ordinary evaporated milk in that the ordinary evaporated milk is merely the whole milk with a portion of water removed, whereas the modified evaporated milk of the process of this invention is for the purpose closely approaching the constituents and ratios of mother's milk. Such a modified evaporated milk product is highly desirable for infant feeding, but it is not intended to limit the scope of the invention to any particular use of the resultant product, since it has all the advantages of the present known types of evaporated milk and may be also used for all purposes to which the present known type of evaporated milk may be adapted or for which it may be employed. However, its digestibility being greatly superior to the known types of evaporated milk, it has special advantages for specialized dietary purposes such as feeding of infants and invalids.

An object of the present invention is to provide a method of preparing a modified evaporated milk which will greatly diminish the curding characteristics of the resultant product, while retaining the advantages of fat and mineral and vitamin content. Another object is to provide a process for making a modified evaporated milk by which the problem of tendency to curdle may be overcome and provide a resultant product closely approaching the analysis of mother's milk.

In this connection, it may be stated that the apparatus employed and designated as the hot well, vacuum pan, homogenizer, and sterilizing apparatus, are well known in the art of processing evaporated milk.

Heretofore, the known process of making modified evaporated milk may be briefly stated as having been to mix together properly proportioned quantities of whole milk and cream, a supplemental quantity of whey and sugar (lactose), and bring them to a boiling point in what is termed a "hot well"; then pass the combined boiled liquid to a vacuum pan where water is evaporated therefrom at a relatively low temperature of approximately 125° to 130° F., then homogenize the product, hermetically seal it in containers, and sterilize the sealed container.

This process has resulted in a frequent curding of the modified evaporated milk at some stage of its manufacture, probably due to varying fermentation reactions in the several ingredients, and has resulted in undesirable factors in its digestibility. Sometimes this curding will occur during the initial boiling step; sometimes in the sterilizing step, and sometimes in the sealed and sterilized product, and sometimes in the digestive system of the user, the latter being particularly noticeable in infant feeding.

I have discovered that the curding may be substantially, if not absolutely, eliminated if the respective constituent products are treated separately to the step of boiling and introduced successively into the vacuum pan. Another reason for separate boiling of the constituents is that the whole milk and cream are larger in quantity and require a given or predetermined time to boil, whereas the whey for that quantity of milk and cream is much less in volume and requires only about one-half the given time to boil, and the sugared syrup requires only about one-fifth the given time to boil. The whey contains milk sugar and the syrup contains cane sugar and dextrose. If the whey and syrup are boiled for the length of time required to bring the milk and cream to a boil, the sugars will caramelize and result in a yellowish hue to the finished product. Nor can the whey and syrup be boiled together separately from the whole milk and cream, because if they are introduced into the milk in the vacuum pan simultaneously, they have a tendency to cause curd in the end product when it is hermetically sealed and sterilized at a higher temperature than boiling. In more detail, the predetermined quantity of combined milk and cream ingredients, which contain the fats and proteins, are subjected to an initial boiling treatment separately; the whey is separately boiled; and the implemented sugar, preferably dextrose, is dissolved in water and separately boiled; and then all products are brought together in the vacuum pan without exposing them to atmospheric conditions after bringing them together.

It is to be understood that there are established requirements for contents of fats and solids prescribed by governmental standards in the manufacture of evaporated milk, and the relative proportions of whole milk and cream and the other contents are proportioned in a ratio which will provide an end product equaling or exceeding the governmental requirements, the standards of which, and the steps and apparatus for testing, being well known in the evaporated milk art.

The percentages stated herein are by weight, avoirdupois, and temperatures are Fahrenheit (boiling point 212° at sea level). Whole milk is milk which has butter fat content of approximately 4%, or equalized at approximately that percentage by addition of fat or dilution with water, as may be necessary.

Without limiting the invention to a specific formula, because of variations necessitated to meet standard requirements, an example of one form which the invention may take is as follows:

Whole milk of 4% fat content, approximately 3000 lbs., to which is added, approximately 120 lbs. of butterfat content, are placed in a hot well and brought to a boiling temperature;

In a separate hot well, the whey from approximately 3000 lbs. of whole milk is separately brought to boiling temperature;

In a separate hot well, approximately 200 lbs. of dextrose is dissolved in water and brought to boiling temperature.

When the foregoing steps have been taken, the separate liquids, that is, the combined boiled whole milk and cream, the boiled whey, and the boiled dextrose solution, are drawn, one at a time, into a closed vacuum pan. They should be introduced into the vacuum pan while at approximately boiling temperature, but their temperature will drop immediately upon reaching the vacuum pan which is maintained at a temperature much lower than atmospheric boiling temperature of 212° F. It is preferred for most efficient results, that the order of drawing them into the vacuum pan shall be, successively, first the milk and cream, second, the whey, and third, the dextrose solution. In the vacuum pan, the atmospheric pressure has been reduced to provide a sufficient degree of vacuum so that the combined milk-whey-dextrose liquid product will boil at approximately 125° to 130° F. This permits boiling for a long period at relatively low temperature without impairment of food values or danger of scorching, and removes about 60% of the water content by evaporation, thus reducing the volume quantity of the product until the solids represent approximately 23% to 25% by weight of the resultant product. After treatment in the vacuum pan, the product is removed to a homogenizer, which thoroughly mixes the entire product in such a way that fat globules and any possible flakes or coagulations are completely dismembered and spread in what may be termed a homogeneous disperse system. After homogenization, the milk product, now having approximately 60% of its free water evaporated, is filled into cans or containers and hermetically sealed. The sealed containers are then processed by feeding them into a retort or sterilizing apparatus, wherein they are subjected to a sterilizing temperature higher than 212° F., usually 240° to 245° F., for a period of time until the sterilizing temperature has completely permeated the entire contents of the sealed container, usually fifteen to eighteen minutes being sufficient. Such processing is usually carried out in a closed pressure chamber for receiving a large number of the sealed containers, injected steam being one usual method employed for providing the sterilizing temperature in such processing chamber.

In the formula given as one illustration herein, the percentage of fat included with the milk is to meet present standard requirements, and should the standard requirement be changed, the percentage of fat may be likewise changed. For that reason, the aggregate of milk and fat may be referred to broadly as fat-included-milk.

Following of the steps of the process herein set forth, and the general use of ingredients in the example set forth, provides a smooth, homogeneous uncurded product, well balanced in food, mineral, and nutrition value, highly suitable for the most delicate human digestive requirements, and highly suitable for infant feeding, since its analysis, comparable to an analysis of the average standard of mother's milk is as follows:

|  | Mother's milk | | This application | |
| --- | --- | --- | --- | --- |
|  | 1st example [1] | 2nd example [2] | Example | Diluted with equal volume water |
|  | Percent | Percent | Percent | Percent |
| Fat | 3.0 to 4.0 | 4.0 | 7.5 | 3.75 |
| Sugar (carbohydrate) | 6.0 to 7.0 | 7.0 | 14.0 | 7.0 |
| Proteins | 1.5 to 2.0 | 2.3 | 4.0 | 2.0 |

[1] First example, Analysis by Julius H. Hess, M. D.
[2] Second example, Analysis by Wm. McK. Marriott, B. S., M. D.

The above percentages are by volume, and it will be noted that in the modified evaporated milk of this application, the product should be diluted with equal volume of water to provide a close analogy to the characteristics of mother's milk.

What I claim as new is:

1. A process for making modified evaporated milk which comprises the steps of separately subjecting fat-included-milk, milk whey, and a sugar solution to a sterilizing temperature, bringing said separate sterilized products together as a combined liquid thereof, subjecting the sterilized combined milk, whey and sugar solution to moisture evaporation at a lower temperature than that to which they had been previously separately subjected and in a closed container from which atmospheric pressure has been partially removed, thereafter hermetically sealing the product in containers, and subjecting the sealed containers to sterilizing heat for a period of time sufficiently long for the sterilizing heat to completely permeate the product in the container.

2. A process for making a modified evaporated milk which comprises the steps of relativey separately subjecting fat-included-milk, milk whey, and sugar solution, to heat sufficient to bring them each to a boil, bringing said separately boiled products together in the successive order of the fat-included milk, the whey, and the sugar solution, subjecting the combined milk, whey and sugar solution to moisture evaporation at a lower temperature than that to which they had been previously separately subjected and in a closed container from which atmospheric pressure has been partially removed, thereafter successively subjecting the resultant product to homogenization, hermetic sealing in containers, and processing by sterilizing heat higher than normal atmospheric boiling temperature.

3. A process for making a modified evaporated milk which comprises the steps of relatively separately subjecting fat-included-milk, milk whey, and dextrose solution, to heat sufficient to bring them each separately to a boil at substantially atmospheric pressure, bringing said sterilized products together in successive order, subjecting the combined milk, whey and dextrose solution to evaporation of a portion of its moisture at a lower temperature than that to which they had been previously subjected and in a closed container from which atmospheric pressure has been partially removed, thereafter homogenizing the resultant product, and thereafter hermetically sealing the product in containers and subjecting the sealed containers to sterilizing temperature higher than normal atmospheric boiling temperature for a period of time sufficiently long for the sterilizing heat to completely permeate the product in the container.

JOHN P. MEYENBERG.